Patented June 26, 1951

2,558,014

UNITED STATES PATENT OFFICE 2,558,014

SUBSTITUTED PIPERAZINE SALTS OF PENICILLIN

Eric T. Stiller, Princeton, N. J., assignor to Wyeth Incorporated, Philadelphia, Pa., a corporation of Delaware No Drawing. Application June 12, 1948, Serial No. 32,729

2 Claims. (Cl. 260—239.1)

This invention relates to the preparation of penicillin salts and more particularly relates to the preparation of salts of penicillin that are sparingly soluble in water.

In order to isolate and, if desired, to purify penicillin I have discovered that penicillin may be substantially quantitatively removed from solution by precipitation therefrom in the form of a salt by the use of certain organic bases, specifically diacidic bases. I have also found that the salts obtained in this manner are sparingly soluble in water. These sparingly soluble salts of penicillin are considered to be of important clinical value for the slow release of penicillin on parenteral application.

The following examples are illustrative of my invention:

Example 1

100,000 units of sodium penicillin are dissolved in $H_2O$ (4 ccs.) cooled and acidified to pH 2.0 with sufuric acid and extracted with amyl acid acetate (2×1½ cc.). The amyl acetate solution is dried over $Na_2SO_4$ and diluted to 12 ccs. and a solution of $N,N^1$-dibenzylpiperazine in amyl acetate is added. A crystalline precipitate is gradually formed while the solution is kept in ice water. It is filtered off and washed with ether and dried in vacuo. The salt, $N,N^1$-dibenzylpiperazine penicillin may be recrystallized by solution in methanol followed by the addition of ether. Long fine colorless needles are thus obtained.

Example 2

A solution of sodium salt of penicillin (100,000 units) in water (5 ccs.) is treated with a solution of $N,N^1$-dibenzylpiperazine dihydrobromide (or chloride) in water (5 ccs.). A crystalline precipitate is obtained of the dibenzylpiperazine salt of penicillin which can be recrystallized by the method described above.

The $N,N^1$-dibenzylpiperazine dihydrobromide solution may be first brought to a substantially neutral point, as for example about pH 6.5, by shaking with free base prior to use as a precipitating solution in the above example.

While the above examples disclose the precipitation of penicillin with a symmetrically disubstituted piperazine or its salts, this should not be taken as limitative of the invention since it is obvious that highly desirable salts of penicillin can also be prepared by using other disubstituted piperazines. Thus, diaralkyl piperazines in general are contemplated as falling within the scope of this invention.

I claim as my invention:

1. As a new compound the $N,N^1$-dibenzylpiperazine salt of penicillin.
2. As new compounds, the $N,N^1$-di(monophen-loweralkyl) piperazine salts of penicillin.

ERIC T. STILLER.

REFERENCES CITED

The following references are of record in the file of this patent:

British Report CMR—Br 234 (CPS—687, PB—79927) received in U. S. April 18, 1946 pages 1 to 4.